United States Patent
Raghavan et al.

(10) Patent No.: US 12,425,079 B2
(45) Date of Patent: Sep. 23, 2025

(54) SWITCHING ACROSS ANTENNA MODULES WITH INDEPENDENT BORESIGHT DIRECTIONS

(71) Applicant: QUALCOMM Incorporated, San Diego, CA (US)

(72) Inventors: Vasanthan Raghavan, West Windsor Township, NJ (US); Sinan Adibelli, San Diego, CA (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 18/450,925

(22) Filed: Aug. 16, 2023

(65) Prior Publication Data
US 2025/0062803 A1   Feb. 20, 2025

(51) Int. Cl.
H04B 7/06    (2006.01)
H04B 7/08    (2006.01)
H04W 28/02   (2009.01)

(52) U.S. Cl.
CPC ........... *H04B 7/0602* (2013.01); *H04B 7/088* (2013.01); *H04W 28/0215* (2013.01)

(58) Field of Classification Search
CPC .... H04B 7/0602; H04B 7/088; H04B 7/0695; H04W 28/0215
See application file for complete search history.

(56) References Cited

U.S. PATENT DOCUMENTS

| 11,178,662 | B2 * | 11/2021 | Chen | H04W 72/0453 |
| 2023/0246348 | A1 * | 8/2023 | Halbauer | H01Q 21/065 |
| | | | | 343/702 |
| 2023/0284093 | A1 * | 9/2023 | Gauvreau | H04W 28/082 |
| | | | | 370/230 |

FOREIGN PATENT DOCUMENTS

| WO | WO-2022055710 A1 * | 3/2022 | H04B 7/0691 |
| WO | WO-2022154567 A1 * | 7/2022 | H04L 1/0046 |

* cited by examiner

*Primary Examiner* — Sophia Vlahos
(74) *Attorney, Agent, or Firm* — Patterson + Sheridan, L.L.P.

(57) ABSTRACT

Certain aspects of the present disclosure provide a method for wireless communications at a user equipment (UE). The UE transmits capability information corresponding to one or more antenna modules of the UE to a network entity. The capability information may include a quantity of boresight directions associated with each antenna module of the one or more antenna modules. The UE may receive from the network entity, after the capability information is transmitted, an indication of a beam switch and/or an antenna module switch. The beam switch indicates a switch from an active beam to a target beam. The antenna module switch indicates a switch from an active antenna module to a target antenna module.

23 Claims, 15 Drawing Sheets

SWITCHING ACROSS ANTENNA MODULES WITH INDEPENDENT BORESIGHT DIRECTIONS

BACKGROUND

Field of the Disclosure

Aspects of the present disclosure relate to wireless communications, and more particularly, to techniques for managing switching across antenna modules with independent boresight directions.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes outputting, for transmission, signaling indicating capability information corresponding to one or more antenna modules of the UE, wherein the capability information comprises a quantity of boresight directions associated with each antenna module of the one or more antenna modules; and obtaining, after the capability information is output, an indication of at least one of: a beam switch or an antenna module switch.

Another aspect provides a method for wireless communications at a network entity. The method includes obtaining signaling indicating capability information corresponding to one or more antenna modules of a user equipment (UE), wherein the capability information comprises a quantity of boresight directions associated with each antenna module of the one or more antenna modules; and outputting, for transmission, after obtaining the capability information, an indication to perform at least one of: a beam switch or an antenna module switch.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
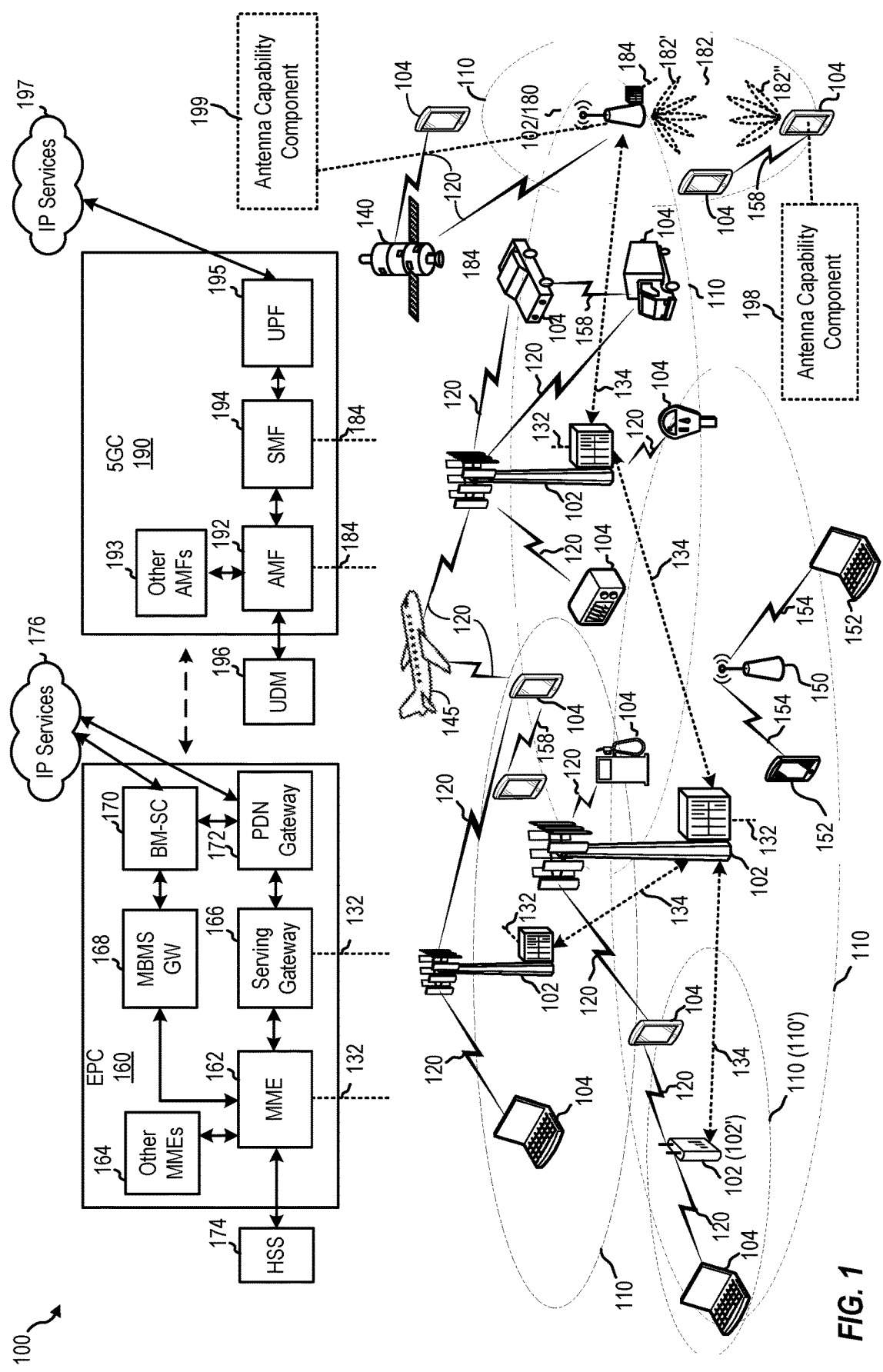
FIG. 1 depicts an example wireless communications network.

Aspects of the present disclosure provide apparatuses, methods, processing systems, and computer-readable mediums for managing switching across antenna modules with independent boresight directions.

A channel between network nodes such as a user equipment (UE) and a gNodeB (gNB) may be characterized by multiple clusters corresponding to reflections or scattering from physical objects in the channel environment. Since azimuth angle of arrival (AOA) and zenith angle of arrival (ZOA) of signals from the clusters are expected to be from any direction at the UE side (e.g., due to ground bounces, reflections from different objects, etc.), array gain metrics for an antenna module of the UE may include an array gain over a sphere around the UE. This is referred to as a spherical coverage of effective isotropic radiated power (EIRP) and/or effective isotropic sensitivity (EIS) in either a transmit mode or a receive mode operation at the UE side.

Antenna modules may be in various configurations. For example, an antenna module may include a 4×1 or a 5×1 linear antenna array. The linear antenna array is able to steer energy only along a single boresight direction. To realize spherical coverage objectives for the UE (e.g., corresponding to network level requirements), additional directional coverage of the energy (i.e., more than one boresight direction) is required. The additional directional coverage of the energy can be achieved by using multiple linear antenna arrays placed at different parts/locations of the UE. However, the use of the multiple linear antenna arrays at the UE can significantly increase cost. To reduce the cost, an antenna module that covers multiple boresight directions (i.e., an antenna module with antennas pointing towards multiple directions) can be used at the UE, which may provide the additional directional coverage of the energy. Antenna modules with the multiple boresight directions may include a L shaped antenna module (e.g., associated with two independent boresight directions), a double L shaped or a planar antenna module (e.g., associated with three independent boresight directions), etc.

Currently, how different antenna modules of the UE are designed is UE-level implementation and the UE does not have to report any information associated with its antenna modules (or their properties) to the gNB. However, in some cases, processing of the information associated with the antenna modules of the UE may allow the gNB to determine how a spherical coverage performance of the UE may look like (both with and without blockage of the antenna modules).

Techniques proposed herein may enable a UE to transmit information associated with antenna modules of the UE, such as a number of independent boresight directions in which energy can be steered, to a gNB. The gNB processes the received information to understand the robustness capabilities of the UE (e.g., to a hand/body blockage condition) and accordingly considers beam switching options specific to the UE. The gNB may also determine which set of antenna modules at the UE may be useful for improving a median or a lower tail performance of a spherical coverage and which set of antenna modules at the UE may be useful for a peak performance of the spherical coverage. This assists the gNB in optimizing the UE performance to the network level requirements and utilities. In some cases, the gNB may request the UE to perform beam switching, which may correspond to switching the antenna modules at the UE (e.g., from an antenna module with a lesser number of steerable boresight directions to an antenna module with more number of steerable boresight directions, or from a L shaped antenna module associated with increased peak array gain in each boresight direction to a double L shaped antenna module associated with better coverage for more boresight directions).

Particular aspects of the subject matter described in this disclosure can be implemented to realize one or more of the following potential advantages. In some examples, the described techniques can lead to improved network level performance due to use of antenna modules associated with a higher array gain. The higher array gain may result in a higher signal strength improvement, which may increase communication reliability and lead to better performance.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
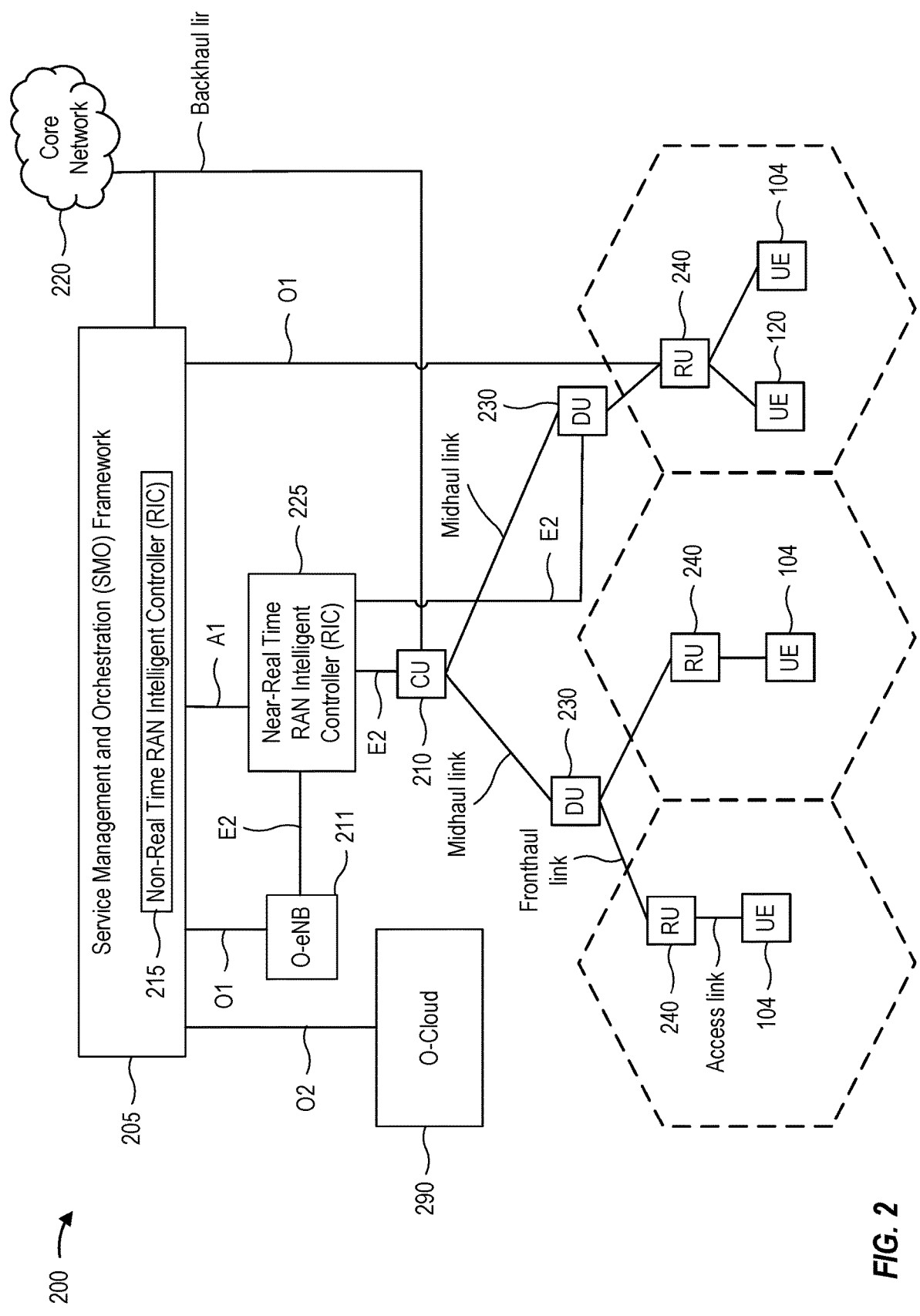
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (Dus), one or more radio units (Rus), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHZ, which is sometimes referred to (interchangeably) as a "millimeter wave" ("mmW" or "mmWave"). A BS configured to communicate using mm Wave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 12:
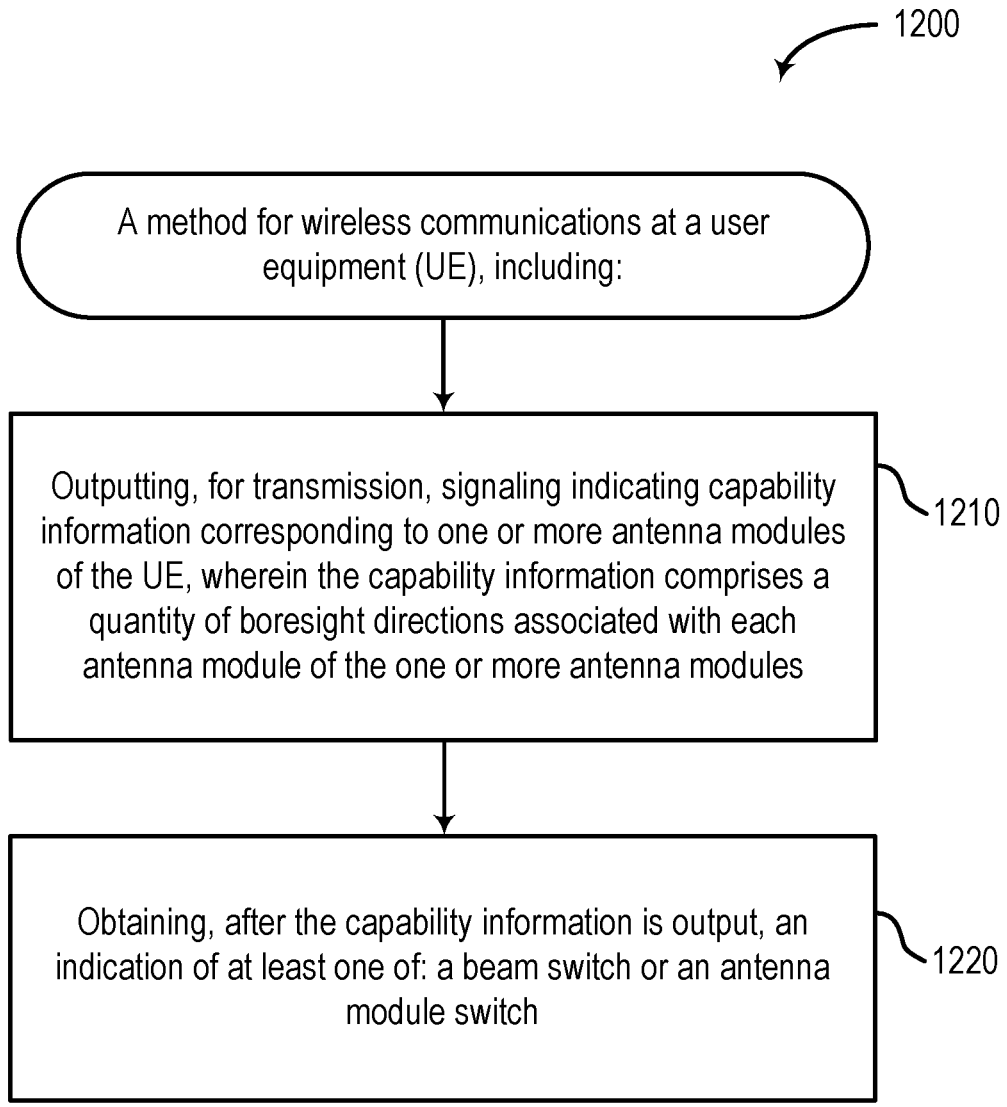
FIG. 12 depicts a method for wireless communications at a network node such as a UE.

Wireless communication network 100 further includes antenna capability component 198, which may be configured to perform method 1200 of FIG. 12. Wireless communication network 100 further includes antenna capability component 199, which may be configured to perform method 1300 of FIG. 13.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (Cus) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (Dus) 230 via respective midhaul links, such as an F1 interface. The Dus 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
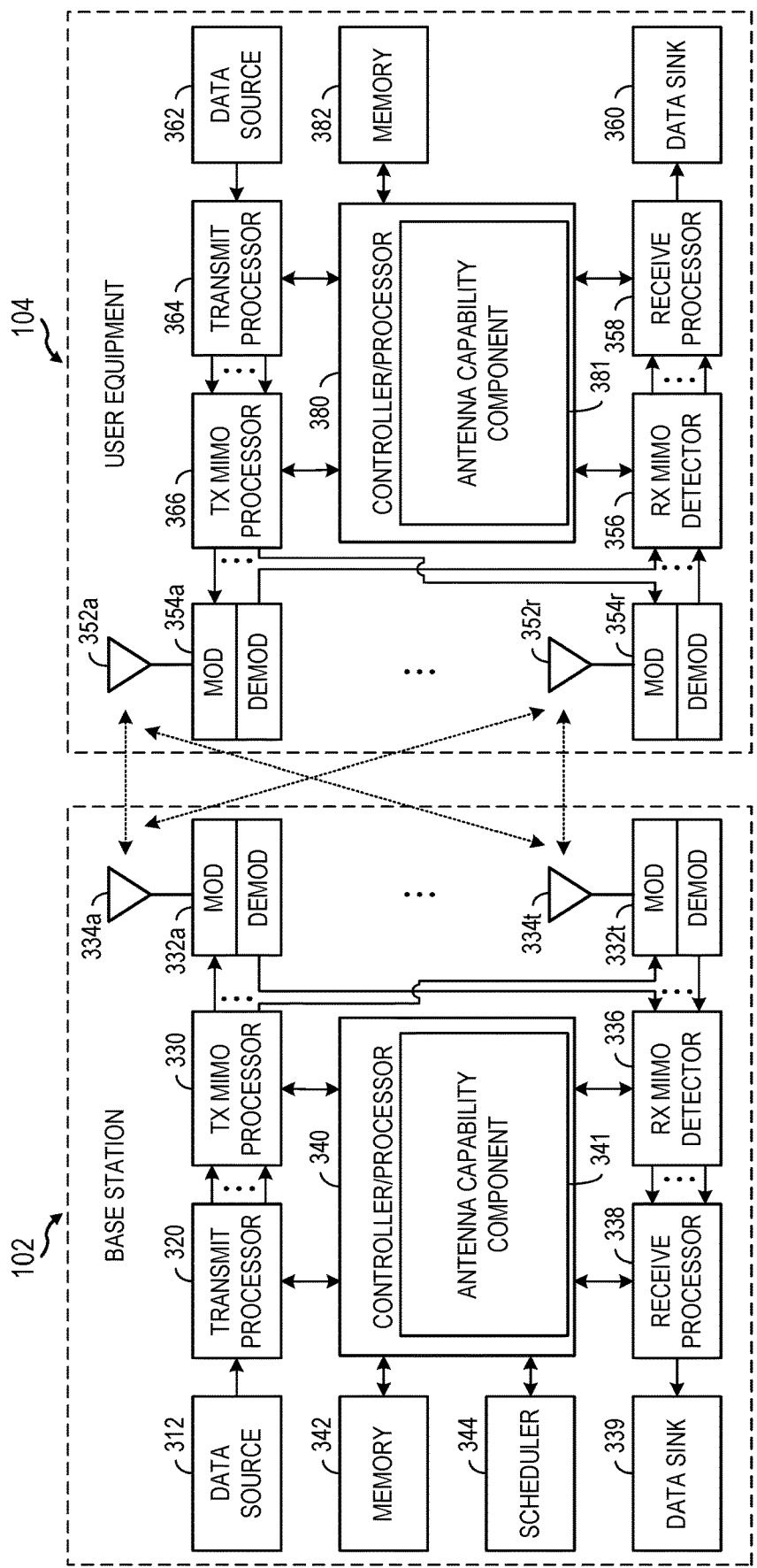
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes antenna capability component 341, which may be representative of antenna capability component 199 of FIG. 1. Notably, while depicted as an aspect of controller/processor 340, antenna capability component 341 may be implemented additionally or alternatively in various other aspects of BS 102 in other implementations.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes antenna capability component 381, which may be representative of antenna capability component 198 of FIG. 1. Notably, while depicted as an aspect of controller/processor 380, antenna capability component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs 104 for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIG. 4A, FIG. 4B, FIG. 4C, and FIG. 4D depict aspects of data structures for a wireless communications network, such as wireless communications network 100 of FIG. 1.

Figure 4:
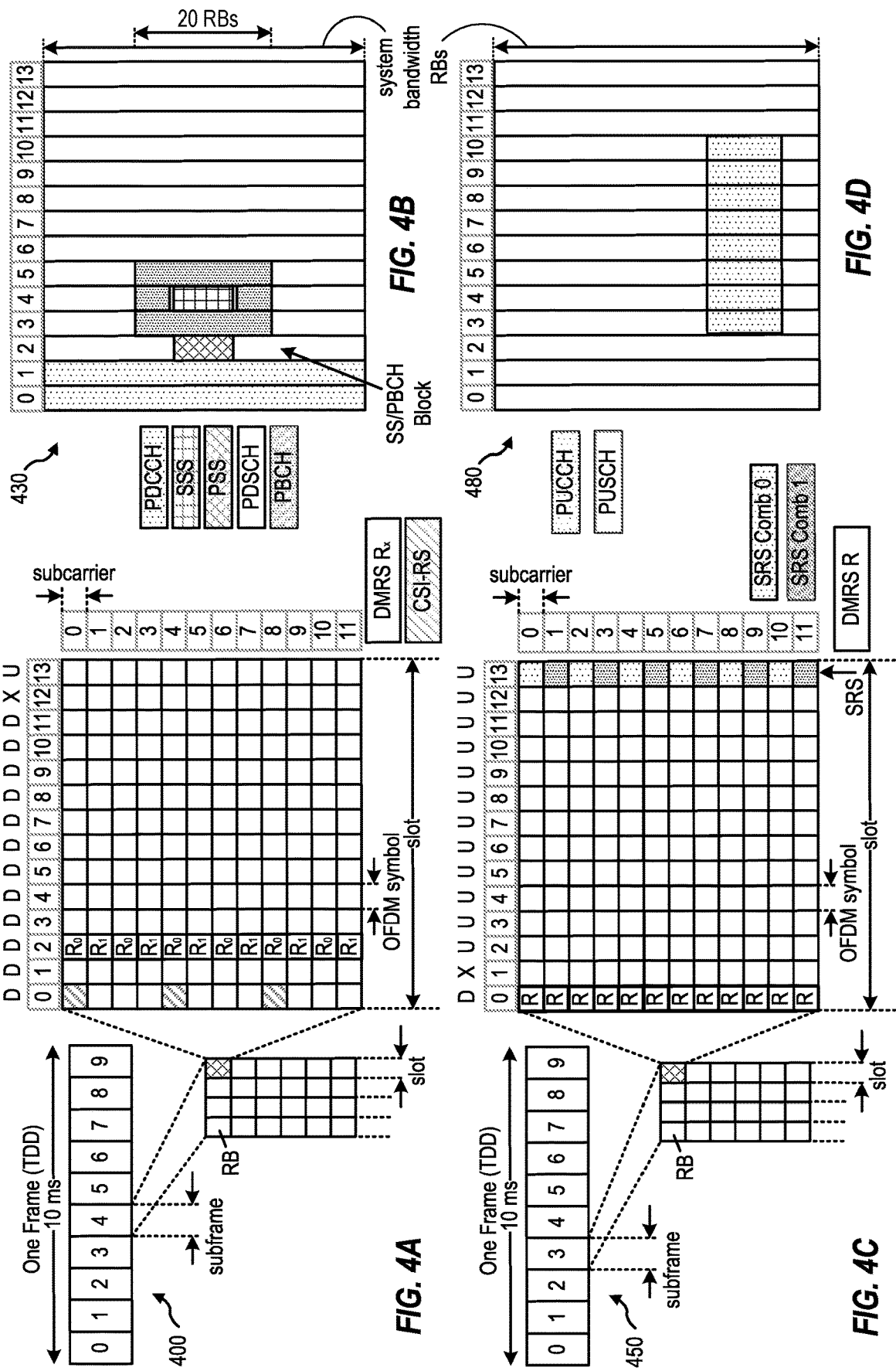
FIG. 4A, FIG. 4B, FIG. 4C, and FIG. 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIG. 4B and FIG. 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs 104 may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIG. 4A, FIG. 4B, FIG. 4C, and FIG. 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIG. 4A, FIG. 4B, FIG. 4C, and FIG. 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIG. 1 and FIG. 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIG. 1 and FIG. 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as $3^{rd}$ generation partnership project (3GPP) standards. For example, 3GPP technical standard TS 38.101 currently defines Frequency Range 1 (FR1) as including 600 MHZ-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mm Wave/near mmWave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Beamforming

In millimeter wave (mmW) systems, beamforming technologies are used to increase antenna array gain. For example, devices such as user equipments (UEs) and network entities (e.g., a gNodeB (gNB)) using wireless communication technologies may include multiple antenna modules where each antenna module may include one or more antenna arrays. Each antenna array may include one or more transmission and reception antennas that can be co-phased and are configured to transmit and receive communications over one or more spatial streams/beams. The use of the multiple antenna arrays may afford the ability to meet spherical coverage requirements with/without hand/body blockage as well as robustness with beam switching over the antenna arrays.

Increases in the antenna array gain facilitate a better quality of signal transmission and reception. To provide the antenna array gain in a particular direction, beamforming is considered. Beamforming is a technique that utilizes advanced antenna technologies on both UEs and gNBs to focus a wireless signal according to a set of beam weights (e.g., in a specific direction), rather than broadcasting to a wide area. For beamforming at a UE, it usually includes a UE receive (Rx) beam sweep from a set of different beams. Beamforming may improve signal-to-noise ratio (SNR) of received signals, eliminate undesirable interference sources, and focus the transmitted signals to specific locations.

Beamforming is also performed to establish a link between the gNB and the UE, where both these devices form a beam directed towards (but not limited to this possibility) each other. For example, both the gNB and the UE find at least one adequate beam to form a communication link between each other. gNB-beam and UE-beam form what is known as a beam pair link (BPL). As an example, on a downlink (DL), the gNB uses a transmit beam and the UE uses a receive beam corresponding to the transmit beam to receive a DL transmission. The combination of the transmit beam and the corresponding receive beam is the BPL.

Overview of Spherical Coverage

A channel between a user equipment (UE) and a network entity (e.g., a gNodeB (gNB)) may be characterized by multiple clusters with each cluster corresponding to a reflection or scattering of signals from the gNB to the UE via a physical object (e.g., vehicles, humans, glass/metallic objects, etc.). Azimuth angle of arrival (AOA) and zenith angle of arrival (ZOA) of signals for each of the cluster as seen at the UE side can be along any direction (e.g., due to ground bounces, reflections from different objects, etc.). Since the AOA and the ZOA of the signals are expected to be from any direction at the UE side, good array gain metrics for a UE may include a good coverage of the array gain over a sphere around the UE. This is called as a spherical coverage of effective isotropic radiated power (EIRP) and/or effective isotropic sensitivity (EIS).

EIRP is a measurement of the radiated output power from an equivalent isotropic antenna in a single direction. The isotropic antenna is meant to distribute power equally in all directions. When the power of the isotropic antenna is channeled in the single direction, the total power of the isotropic antenna in the single direction is known as the EIRP. In antenna measurements, measured sensitivity over each angle is called the EIS of an antenna in that direction.

The spherical coverage may be specified by a cumulative distribution function (CDF) of the EIRP and/or the EIS, which is a combination of a transmitted power and the array gain. An upper bound and a lower bound of the spherical coverage may be based on electric field (E-field) radiation data of antennas of one or more antenna arrays of an antenna module.

Spherical coverage objectives for the UE may be specified in terms of a peak performance (e.g., a peak array gain) and different percentile levels (e.g., $20^{th}$, $50^{th}$, 80th percentile levels) of the EIRP/EIS over the sphere around the UE at different frequencies and/or bands.

Overview of Antenna Modules

An antenna module includes one or more antenna arrays having a set of antennas. For example, the antenna module may include a 4×1 or a 5×1 linear (dual-polarized) antenna array. The linear antenna array is able to steer energy only along a single boresight direction.

To realize spherical coverage objectives for a user equipment (UE) at the middle and lower percentile points, additional directional coverage of the energy (i.e., more than one boresight direction) is required than provided by the linear antenna array. The additional directional coverage of the energy can be achieved by using multiple antenna modules/linear antenna arrays at the UE.

Figure 5:
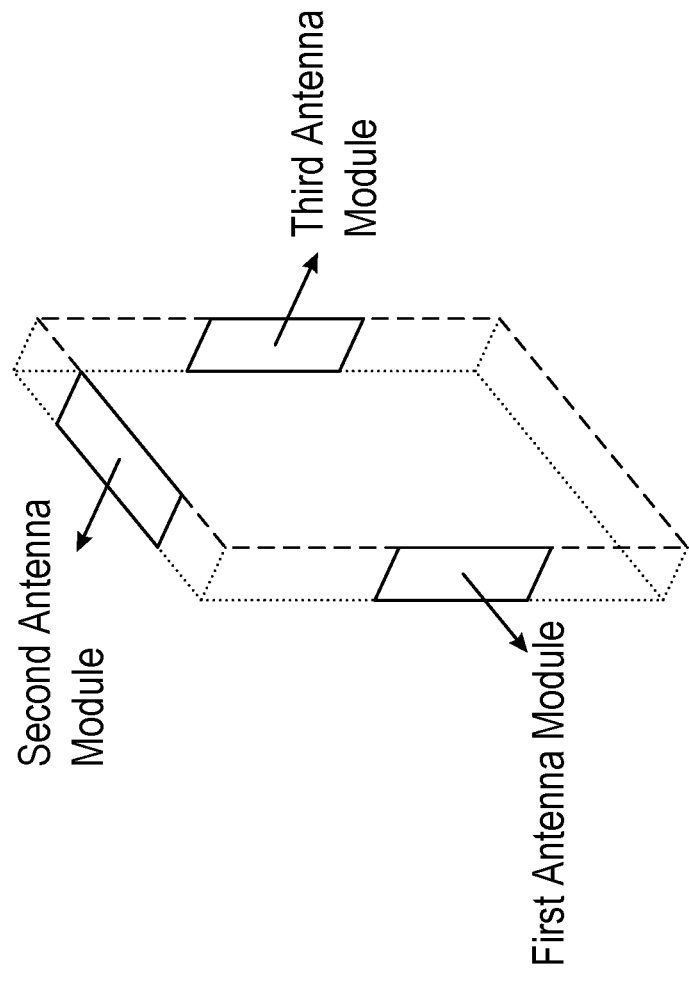
FIG. 5 depicts multiple antenna modules on multiple edges or sides of a UE.

For example, the UE may be equipped with the multiple antenna modules on multiple edges or sides of the UE for the additional directional coverage of the energy. For example, as depicted in a diagram 500 of FIG. 5, the UE includes a first antenna module on a first side of the UE, a second antenna module on a second side of the UE, and a third antenna module on a third side of the UE. Each of these antenna modules may be able to steer energy along an independent boresight direction.

In some cases, the multiple antenna modules may be placed on a single long edge or side of the UE. For example, the UE may include two antenna modules on one edge or side of the UE. In another example, the UE may include two antenna modules on each edge or side of the UE.

The use of the multiple antenna modules at the UE can significantly increase cost. To reduce cost, a single antenna module that covers multiple boresight directions (i.e., an antenna module with antennas or antenna elements pointing towards multiple directions) can be used at the UE, which may provide the additional directional coverage of the energy.

The antenna module with the multiple boresight directions may include a L shaped antenna module, a double L shaped or a planar structured antenna module, etc.

Figure 6:
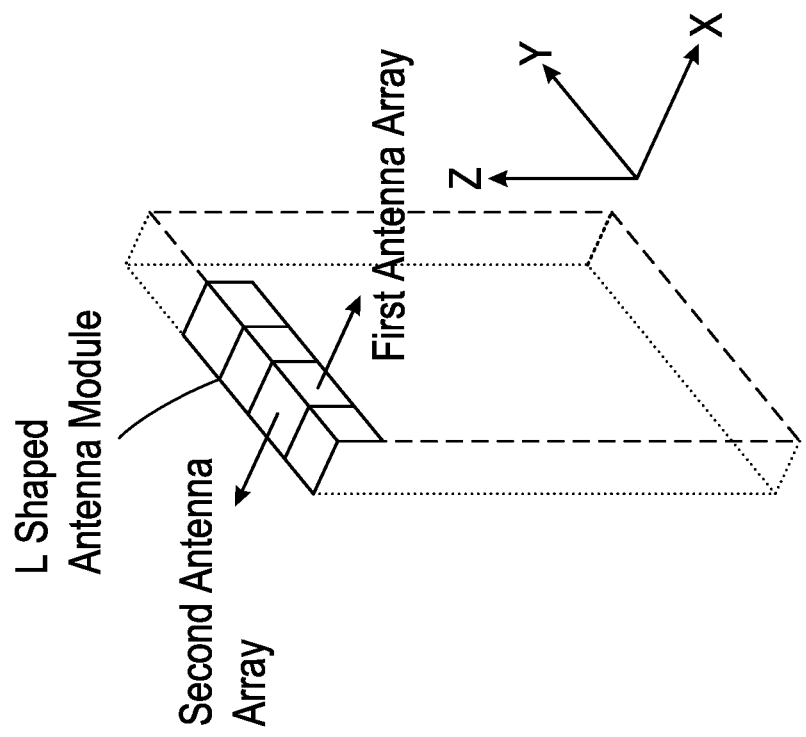
FIG. 6 depicts a L shaped antenna module on an edge or a side of a UE.

FIG. 6 depicts a diagram 600 of a L shaped antenna module on an edge or a side of a UE. The L shaped antenna module is associated with two independent boresight directions (e.g., along X and Z axes). For example, a first antenna array of the L shaped antenna module is associated with a first boresight direction and a second antenna array of the L shaped antenna module is associated with a second boresight direction.

Figure 7:
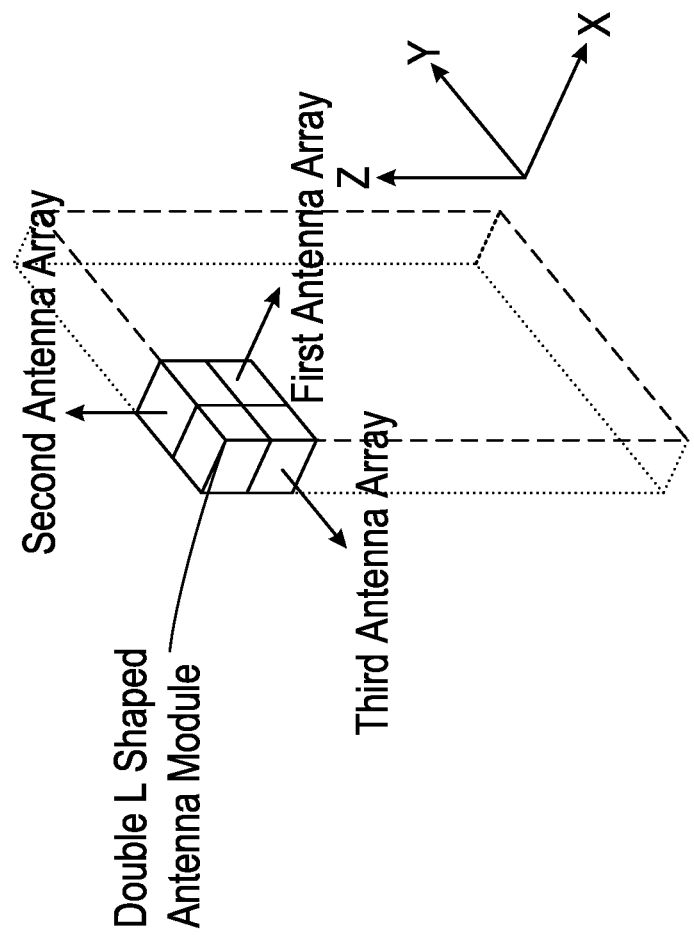
FIG. 7 depicts a double L shaped antenna module on an edge or a side of a UE.

FIG. 7 depicts a diagram 700 of a double L shaped antenna module on an edge or a side of a UE. The double L shaped antenna module is associated with three independent boresight directions (e.g., along X, Y and Z axes). For example, a first antenna array of the double L shaped antenna module is associated with a first boresight direction, a second antenna array of the double L shaped antenna module is associated with a second boresight direction, and a third antenna array of the double L shaped antenna module is associated with a third boresight direction.

A radio frequency integrated circuit (RFIC) device associated with the L shaped antenna module (e.g., that covers two independent boresight directions) and the double L shaped antenna module (e.g., that covers three independent boresight directions) may control a number of antenna feeds. In some cases, when a total number of antenna feeds controlled by the RFIC device may remain same in both the L shaped antenna module and the double L shaped antenna module, a number of antennas steering peak energy towards each boresight direction is smaller/comparable in the double L shaped antenna module relative to the L shaped antenna module. That is, more boresight directions can be covered with the double L shaped antenna module than the L shaped antenna module, at the cost of a peak array gain in each boresight direction.

Accordingly, broader tradeoffs between the L shaped antenna module and the double L shaped antenna module may include better coverage for more boresight directions (e.g., in the double L shaped antenna module) and increased peak array gain in each boresight direction (e.g., in the L shaped antenna module). These tradeoffs affect spherical coverage performance in different ways. For example, the spherical coverage performance at middle percentile points may be improved by using the double L shaped antenna module whereas the spherical coverage performance at peak percentile points may be improved by using the L shaped antenna module.

In many applications, an original equipment manufacturer (OEM) may easily realize the spherical coverage objectives at peak percentile points. However, realizing such stringent spherical coverage objectives at lower percentile points (e.g., $50^{th}$% tile or $20^{th}$% tile) with a reduced number of antenna modules may become difficult even for premium-tier OEMs. Accordingly, the use of antenna modules with multiple boresight directions (such as the double L shaped antenna module) can assist in such scenarios.

Figure 8:
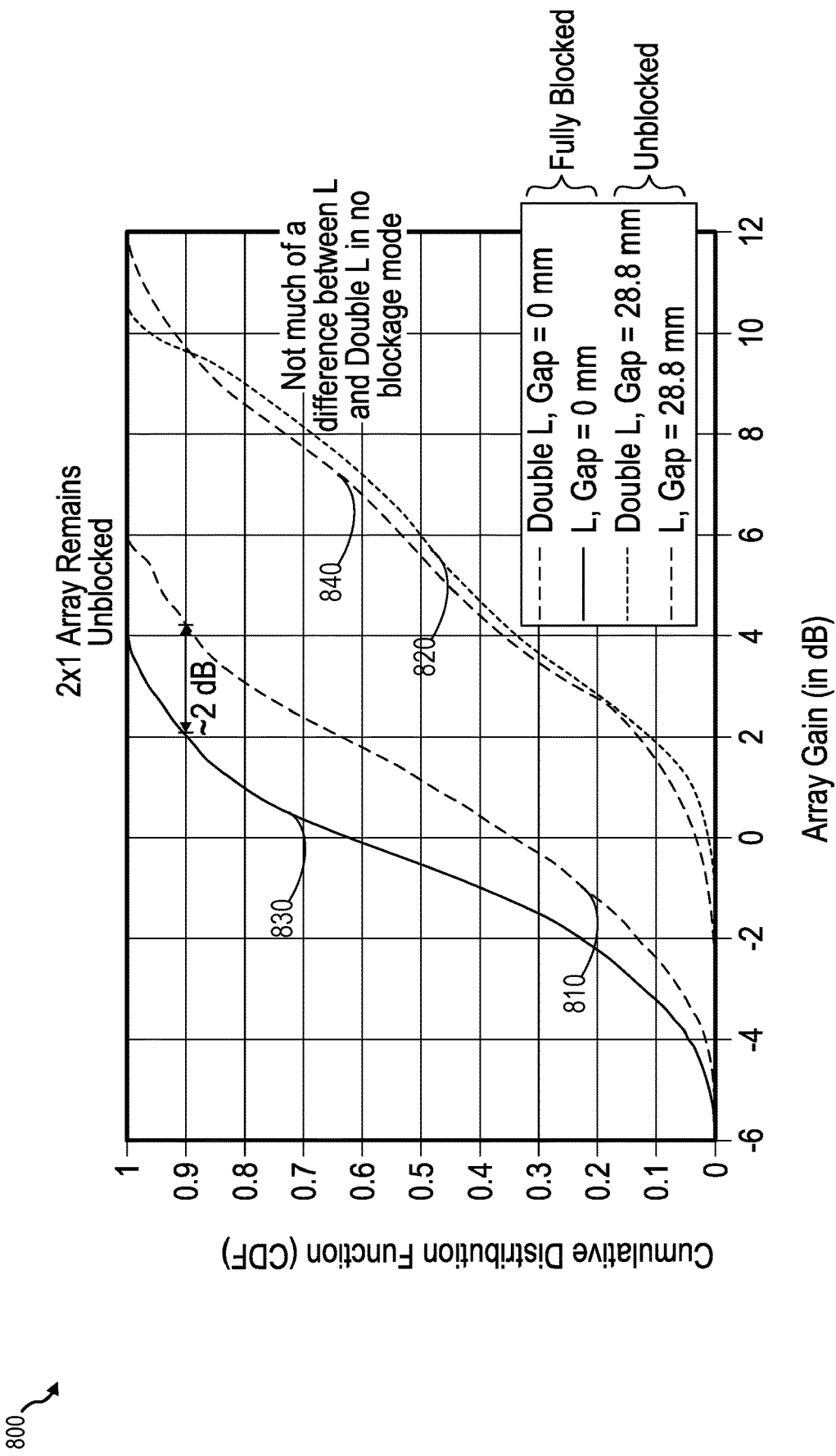
FIG. 8 depicts array gains for different antenna modules.

FIG. 8 depicts a diagram 800 showing array gains (directivity) for different antenna modules (including antenna arrays) of a UE, based on different beamforming codebooks. A beamforming codebook may include a set of beams. In one example, the beamforming codebook may be an analog beamforming codebook. In another example, the beamforming codebook may be a hybrid beamforming codebook.

The antenna modules provide a spherical coverage over the UE. Based on electric fields (E-fields) of antennas of the antenna modules over an entire sphere, an optimal maximum-ratio combining (MRC) solution consists of maximizing an energy over each direction of the sphere by an appropriate choice of a phase shifter and gain state selection for each antenna specific to that direction of the sphere.

The diagram 800 includes the array gains of a double L shaped antenna module without a gap 810, a double L shaped antenna module with a gap 820, a L shaped antenna module without a gap 830, and a L shaped antenna module with a gap 840.

As depicted, the array gain of the double L shaped antenna module with the gap 820 is similar to the array gain of the L shaped antenna module with the gap 840. That is, there is not much of a difference between the array gains of the double L shaped antenna module and the L shaped antenna module in a no blockage mode of the double L shaped antenna module and the L shaped antenna module.

However, the double L shaped antenna module without the gap 810 has a higher array gain than the L shaped antenna module without the gap 830. That is, during a blockage of the double L shaped antenna module and the L shaped antenna module (e.g., by a hand, etc.), there is about ~2 decibel (dB) improvement at 90% with the double L shaped antenna module over the L shaped antenna module.

Aspects Related to Methods for Managing Switching Across Antenna Modules with Multiple Independent Boresight Directions Aspects of the present disclosure provide apparatuses, methods, processing systems, and computer-readable mediums for managing switching across antenna modules with independent boresight directions.

Techniques proposed herein may enable a user equipment (UE) to transmit information associated with antenna modules of the UE, such as a number of independent boresight directions in which energy can be steered, to a gNodeB (gNodeB). The gNB may process the received information to understand the robustness capabilities of the UE (e.g., to a hand/body blockage condition) and accordingly consider beam switching options specific to the UE. The gNB may also determine which set of antenna modules at the UE may be useful for improving a median or a lower tail performance of a spherical coverage and which set of antenna modules at the UE may be useful for a peak performance of the spherical coverage. In some cases, the gNB may request the UE to perform beam switching, which may correspond to switching the antenna modules at the UE (e.g., from an antenna module with a lesser number of steerable boresight directions to an antenna module with more number of steerable boresight directions, or from a L shaped antenna module associated with increased peak array gain in each boresight direction to a double L shaped antenna module associated with better coverage for more boresight directions).

The described techniques can lead to improved network level performance due to use of antenna modules associated with a higher array gain at the UE. The higher array gain may also result in a higher signal strength improvement, which may increase communication reliability and lead to better performance.

The techniques proposed herein for managing the switching across the antenna modules with the independent boresight directions may be understood with reference to FIG. 9-FIG. 15.

Figure 9:
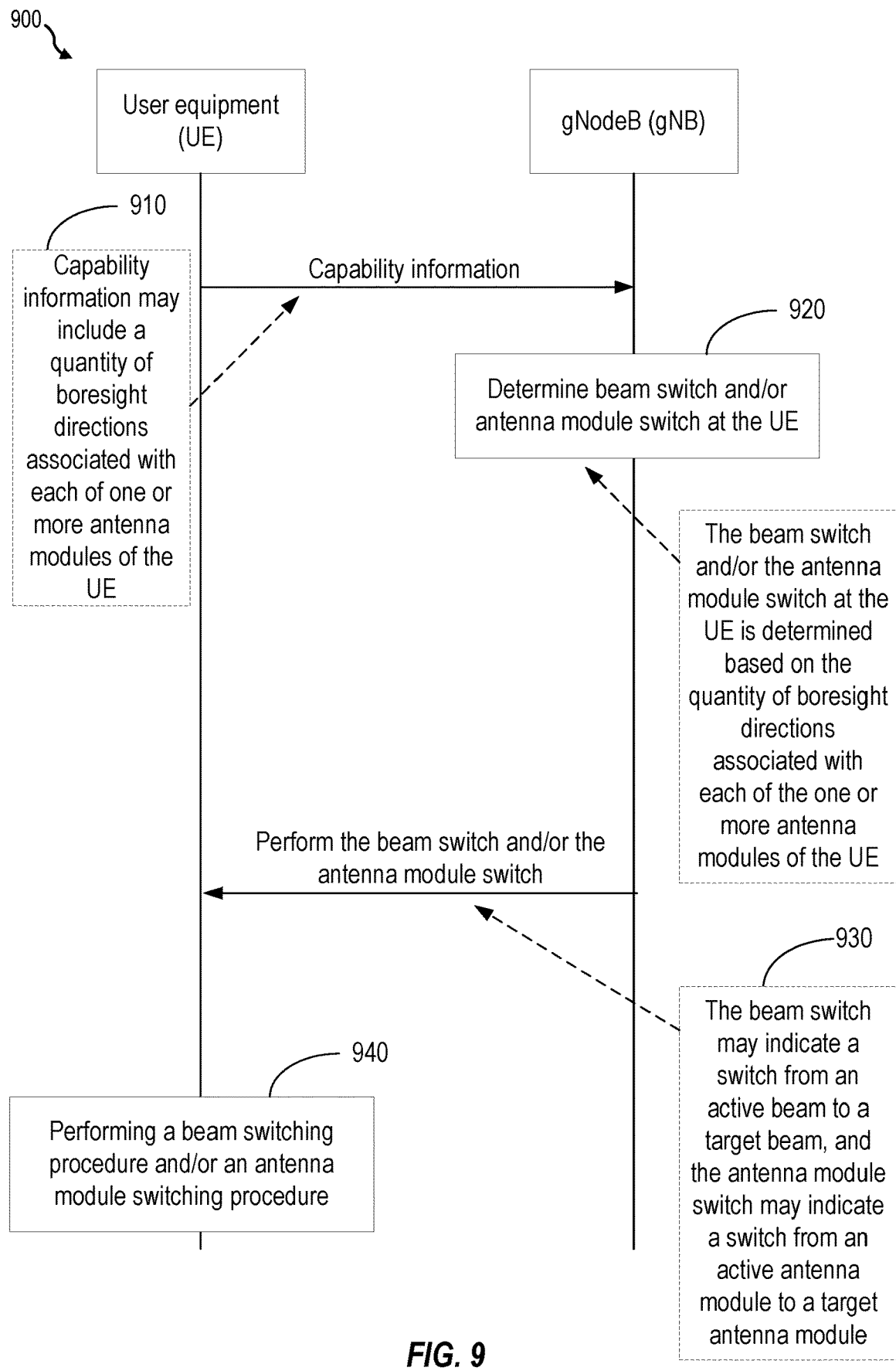
FIG. 9 depicts a call flow diagram illustrating example communication among a UE and a network entity.

FIG. 9 depicts a call flow diagram 900 illustrating example communication among a UE and a network entity (e.g., a gNB) for managing switching across antenna modules with independent boresight directions. The UE shown in FIG. 9 may be an example of the UE 104 depicted and described with respect to FIG. 1 and FIG. 3. The gNB depicted in FIG. 9 may be an example of the BS 102 depicted and described with respect to FIG. 1 and FIG. 3, or the disaggregated BS depicted and described with respect to FIG. 2.

As indicated at 910, the UE transmits capability information corresponding to one or more antenna modules of the UE to the gNB.

In certain aspects, the capability information includes a quantity (or a number) of boresight directions associated with each antenna module of the one or more antenna modules of the UE. Each boresight direction of each antenna module may correspond to a direction of a peak gain of the antenna module.

Each antenna module may include multiple sets of antennas (e.g., multiple antenna arrays), and each set of antennas or antenna array is associated with a distinct and independent boresight direction. For example, a L shaped antenna module includes two antenna arrays that are associated with two distinct and independent boresight directions. In another example, a double L shaped antenna module includes three antenna arrays that are associated with three distinct and independent boresight directions.

The independence of different boresight directions is based on spatial separation of the boresight directions by an angle threshold value (or a threshold separation angle). That is, each boresight direction is separated from another boresight direction by at least the angle threshold value. For example, a double L shaped antenna module is associated with a first boresight direction, a second boresight direction, and a third boresight direction. In one case, the first boresight direction is separated from the second boresight direction by a first angle threshold value (e.g., 30 degrees), and the second boresight direction is also separated from the third boresight direction by at least the first angle threshold value. In another case, the first boresight direction is separated from the second boresight direction by at least the first angle threshold value, and the second boresight direction is separated from the third boresight direction by at least a second angle threshold value (e.g., 40 degrees).

In certain aspects, the quantity of boresight directions associated with an antenna module of the UE indicates or implies a shape of the antenna module of the UE. For example, a single boresight direction associated with an antenna module of the UE may imply that the antenna module is a linear antenna module or a planar antenna module. In another example, two boresight directions associated with an antenna module of the UE may imply that the antenna module is a L shaped antenna module. In another example, three boresight directions associated with an antenna module of the UE may imply that the antenna module is a double L shaped antenna module.

In certain aspects, the capability information includes a value of a peak gain in each boresight direction of each antenna module. For example, the UE may have a L shaped antenna module associated with a first boresight direction and a second boresight direction. In such cases, the capability information of the UE may include a first value of the peak gain in the first boresight direction and a second value of the peak gain in the second boresight direction. The first value of the peak gain may be same or different from the second value of the peak gain.

In certain aspects, the capability information may include radio frequency integrated circuit (RFIC) information. The RFIC information may include a quantity (or a number) of RFIC devices of the UE. The RFIC information may further include one or more boresight directions of each antenna module associated with each RFIC device of the UE.

Figure 10:
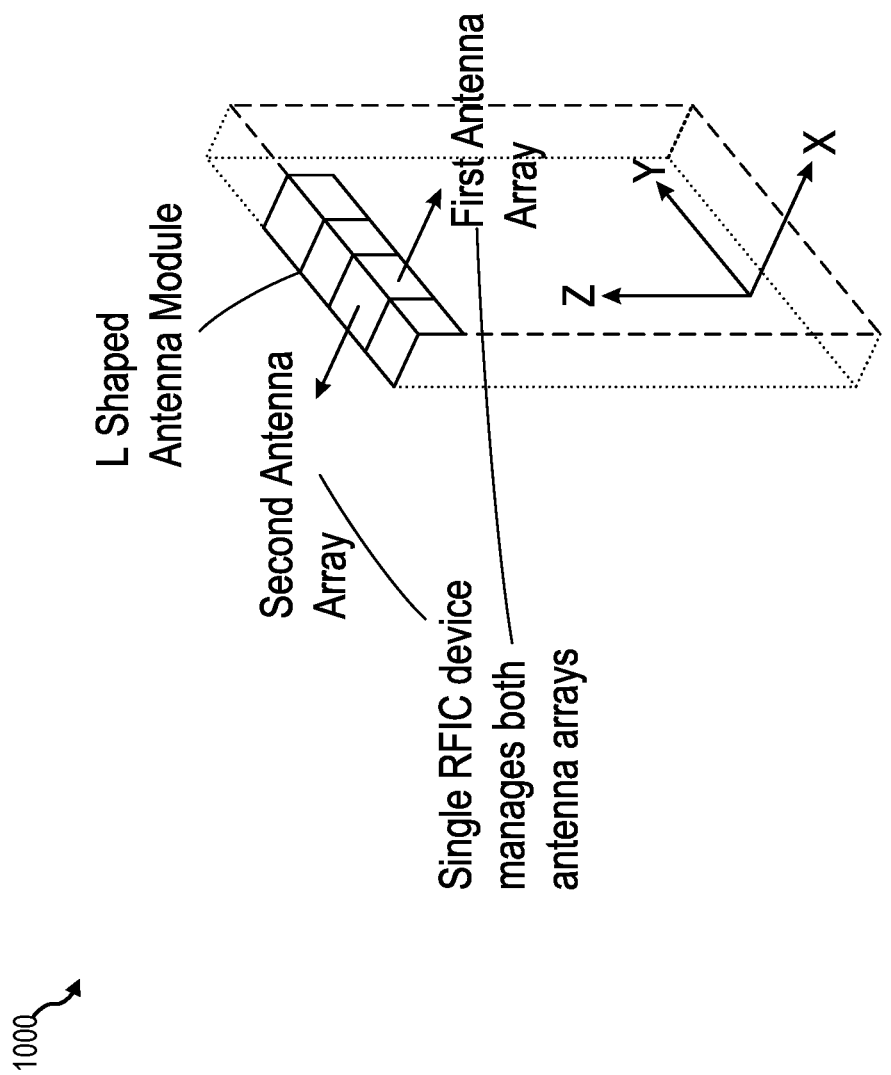
FIG. 10 depicts multiple antenna arrays of an antenna module that are managed or controlled by a single radio frequency integrated circuit (RFIC) device.

In one example, the capability information may include a single RFIC device of the UE, which may manage or control two antenna arrays of a L shaped antenna module of the UE to steer energy in two independent and perpendicular directions (i.e., boresight directions of a first antenna array and a second antenna array of the L shaped antenna module, as depicted in a diagram 1000 of FIG. 10). That is, the capability information may indicate the two independent boresight directions for the single RFIC device controlling the L shaped antenna module.

Figure 11:
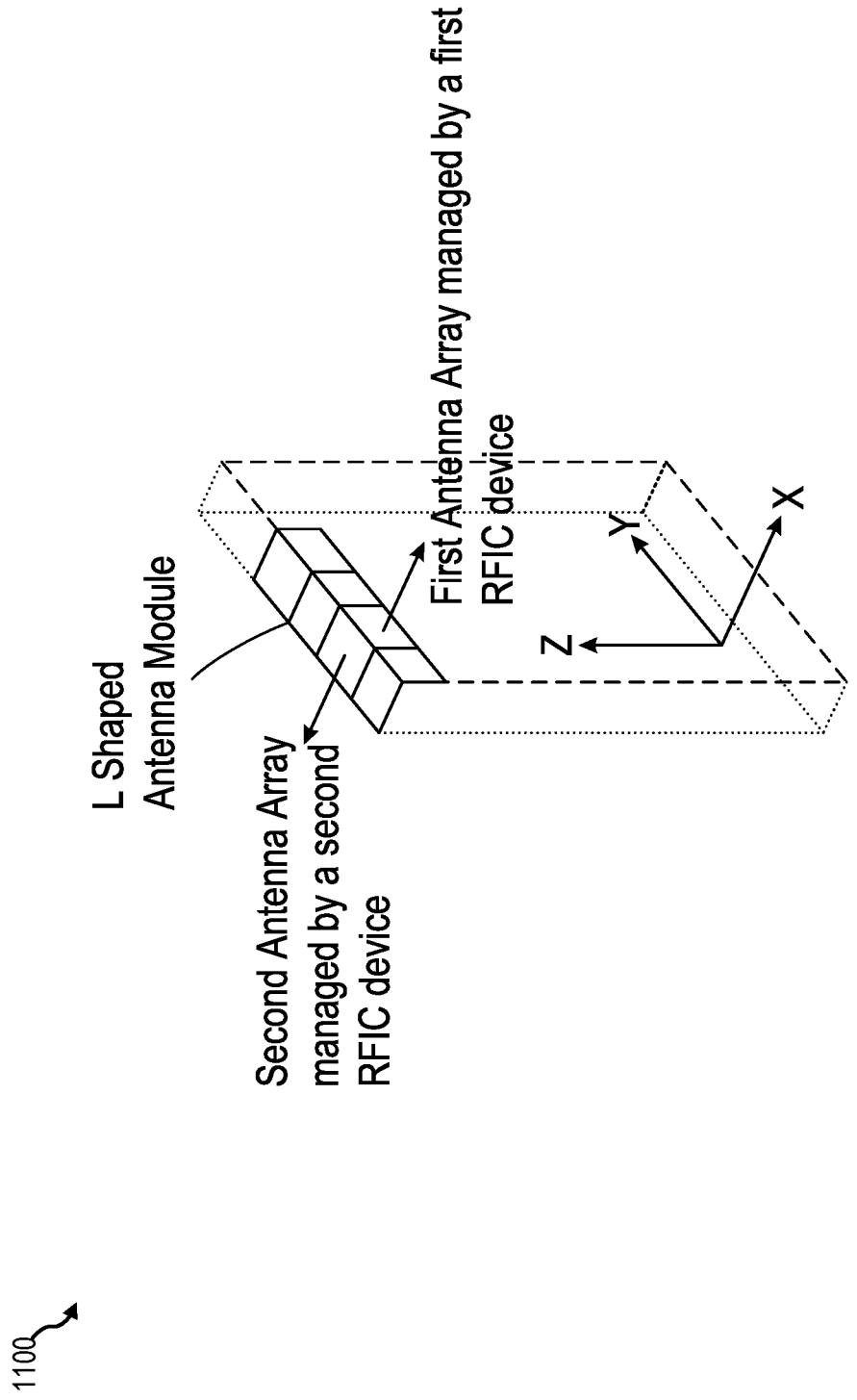
FIG. 11 depicts multiple antenna arrays of an antenna module that are managed or controlled by multiple RFIC devices.

In another example, the capability information may include two RFIC devices of the UE, which may manage or control two independent antenna arrays of a L shaped antenna module of the UE that are placed perpendicular to each other and with each antenna array being able to steer energy in only one independent direction (i.e., a first RFIC device manages a first antenna array and a second RFIC device manages a second antenna array, as depicted in a diagram 1100 of FIG. 11). That is, the capability information may indicate one independent boresight direction for each RFIC device of the two RFIC devices controlling the L shaped antenna module.

Referring back to FIG. 9, the UE may also transmit beam information to the gNB. In one aspect, the capability information may include the beam information. In another aspect, the capability information and the beam information may be transmitted separately to the gNB.

In one aspect, the beam information includes a reference signal received power (RSRP) associated with an active beam of the UE. For example, the beam information may include the RSRP associated with a serving beam pair (which includes active beams of the UE and the gNB).

In another aspect, the beam information includes a beam report indicating a transmission configuration indicator (TCI) state associated with the gNB.

As indicated at 920, the gNB determines whether there is a need for a beam switch and/or an antenna module switch at the UE, based on the capability information of the UE.

In another aspect, the gNB may determine whether there is the need for the beam switch and/or the antenna module switch at the UE, based on the capability information as well as the beam information.

In another aspect, the gNB may determine whether there is the need for the beam switch and/or the antenna module switch at the UE, based on the capability information and reference signal (RS) information. The RS information may indicate RS allocation or grant for the UE or the gNB (e.g., for learning adaptive beam weights at the UE or the gNB to realize the array gain possible with the antenna module).

In another aspect, the gNB may determine whether there is the need for the beam switch and/or the antenna module switch at the UE, based on the capability information, the beam information, and the RS information. For example, based on the capability information, the beam information, and/or the RS information, the gNB may determine likely spherical coverage performance of effective isotropic radiated power (EIRP) and/or effective isotropic sensitivity (EIS) (e.g., both with and without hand blockage at the UE). Based on the likely spherical coverage performance, the gNB may understand robustness capabilities of the UE to the hand/body blockage condition and consider beam switching possibilities specific to the UE. The gNB may also understand which antenna module may be useful for improving a median or a lower tail performance over a sphere (e.g., an antenna gain over the sphere) around the UE and which antenna module may be useful for a peak performance (e.g., a peak gain) over the sphere around the UE.

In certain aspects, the beam switch may indicate a switch from one or more active beams at the UE to one or more target beams. The gNB may determine a target beam from a set of beams for the UE based on the capability information, the beam information, and/or the RS information.

In one example, the gNB may determine a first target beam from the set of beams for the UE, when the quantity of boresight directions associated with each antenna module of the one or more antenna modules exceeds a first threshold value. The gNB may determine a second target beam from the set of beams for the UE, when the quantity of boresight directions associated with each antenna module of the one or more antenna modules does not exceed the first threshold value. The first target beam is different from the second target beam.

In another example, the gNB may determine a third target beam from the set of beams for the UE, when the quantity of boresight directions associated with each antenna module of the one or more antenna modules exceeds the first threshold value and the RSRP associated with the active beam of the UE exceeds a second threshold value. The gNB may determine a fourth target beam from the set of beams for the UE, when the quantity of boresight directions associated with each antenna module of the one or more antenna modules does not exceed the first threshold value and the RSRP associated with the active beam of the UE does not exceed the second threshold value. The third target beam is different from the fourth target beam.

In certain aspects, the antenna module switch may indicate a switch from one or more active antenna modules at the UE to one or more target antenna modules at the UE (e.g., switch from one antenna module with a lesser number of steerable boresight directions to another antenna module with more number of steerable boresight directions). The gNB may determine a target antenna module from a set of antenna modules for the UE, based on the capability information, the beam information, and/or the RS information.

In one example, the gNB may determine a first target antenna module from the set of antenna modules for the UE, when the quantity of boresight directions associated with each antenna module of the one or more antenna modules exceeds the first threshold value. The gNB may determine a second target antenna module from the set of antenna modules for the UE, when the quantity of boresight directions associated with each antenna module of the one or more antenna modules does not exceed the first threshold value. The first target antenna module is different from the second target antenna module in terms of the quantity of boresight directions.

In another example, the gNB may determine a third target antenna module from the set of antenna modules for the UE, when the quantity of boresight directions associated with each antenna module of the one or more antenna modules exceeds the first threshold value and the RSRP associated with the active beam of the UE exceeds the second threshold value. The gNB may determine a fourth target antenna module from the set of antenna modules for the UE, when the quantity of boresight directions associated with each antenna module of the one or more antenna modules does not exceed the first threshold value and the RSRP associated with the active beam of the UE does not exceed the second threshold value. The third target antenna module is different from the fourth target antenna module in terms of the quantity of boresight directions.

As indicated at 930, the gNB transmits an indication to the UE to perform the beam switch and/or the antenna module switch, in accordance with the determination. The gNB may also transmit information associated with the target beam and/or the target antenna module to the UE.

As indicated at 940, the UE performs a beam switch procedure and/or an antenna module procedure. In one example, the UE may switch from the active beam to the target beam. In another example, the UE may switch from the active antenna module to the target antenna module.

Example Method for Wireless Communications at a User Equipment (UE)

FIG. 12 shows an example of a method 1200 for wireless communications at a network node such as a user equipment (UE) (e.g., the UE 104 of FIG. 1 and FIG. 3).

Method 1200 begins at step 1210 with outputting, for transmission, signaling indicating capability information corresponding to one or more antenna modules of the UE. The capability information includes a quantity of boresight directions associated with each antenna module of the one or more antenna modules. In some cases, the operations of this step refer to, or may be performed by, circuitry for outputting and/or code for outputting as described with reference to FIG. 14.

Method 1200 then proceeds to step 1220 with obtaining, after the capability information is output, an indication of at least one of: a beam switch or an antenna module switch. In some cases, the operations of this step refer to, or may be performed by, circuitry for obtaining and/or code for obtaining as described with reference to FIG. 14.

In certain aspects, each boresight direction of each antenna module corresponds to a direction of a peak gain of the antenna module.

In certain aspects, the beam switch indicates a switch from an active beam to a target beam; and the target beam is based on the capability information.

In certain aspects, the method 1200 further includes performing a beam switching procedure to switch from the active beam to the target beam, in accordance with the beam switch.

In certain aspects, the antenna module switch indicates a switch from an active antenna module of the one or more antenna modules to a target antenna module of the one or more antenna modules; and the target antenna module is based on the capability information.

In certain aspects, the method 1200 further includes performing an antenna module switching procedure to switch from the active antenna module to the target antenna module, in accordance with the antenna module switch.

In certain aspects, each antenna module includes one or more sets of antennas; and each set of antennas of each antenna module is associated with a distinct boresight direction.

In certain aspects, each boresight direction is separated from another boresight direction by an angle threshold value.

In certain aspects, the capability information further includes a value of a peak gain in each boresight direction of each antenna module.

In certain aspects, the method 1200 further includes outputting, for transmission, signaling indicating beam information comprising at least one of: a reference signal received power (RSRP) associated with an active beam of the UE; or a beam report indicating a transmission configuration indicator (TCI) state associated with a network entity.

In certain aspects, at least one of the beam switch or the antenna module switch is based on the capability information and at least one of: the beam information; or reference signal (RS) information indicating a grant of RSs to be communicated by at least one of the UE or a network entity.

Figure 14:
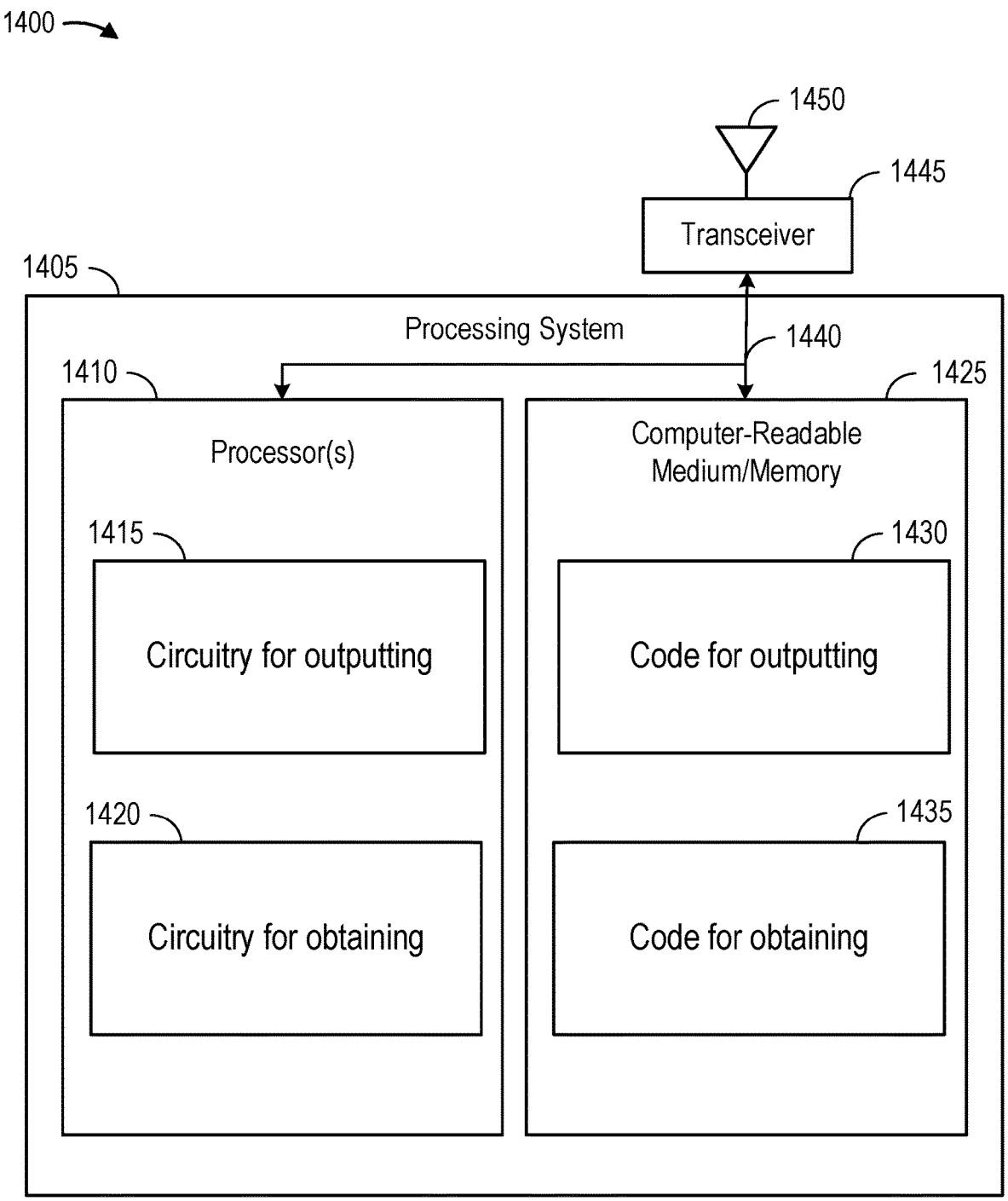
FIG. 14 and FIG. 15 depict example communications devices.

In one aspect, the method 1200, or any aspect related to it, may be performed by an apparatus, such as a communications device 1400 of FIG. 14, which includes various components operable, configured, or adapted to perform the method 1200. The communications device 1400 is described below in further detail.

Note that FIG. 12 is just one example of a method, and other methods including fewer, additional, or alternative steps are possible consistent with this disclosure.

Example Method for Wireless Communications at a Network Entity

Figure 13:
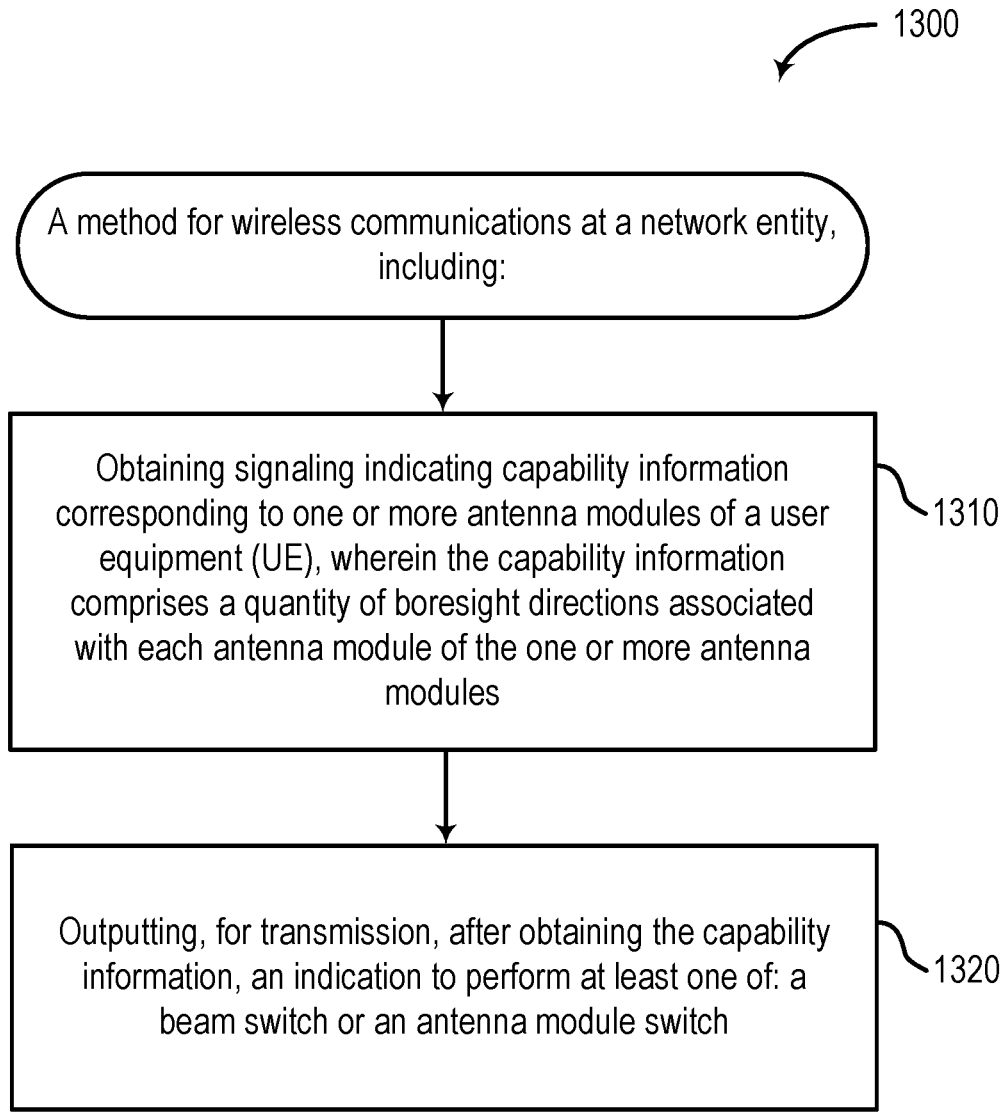
FIG. 13 depicts a method for wireless communications at a network node such as a network entity.

FIG. 13 shows an example of a method 1300 for wireless communications at a network node such as a network entity (e.g., the BS 102 of FIG. 1 and FIG. 3).

Method 1300 begins at step 1310 with obtaining signaling indicating capability information corresponding to one or more antenna modules of a user equipment (UE). The capability information includes a quantity of boresight directions associated with each antenna module of the one or more antenna modules. In some cases, the operations of this step refer to, or may be performed by, circuitry for obtaining and/or code for obtaining as described with reference to FIG. 15.

Method 1300 then proceeds to step 1320 with outputting, for transmission, after obtaining the capability information, an indication to perform at least one of: a beam switch or an antenna module switch. In some cases, the operations of this step refer to, or may be performed by, circuitry for outputting and/or code for outputting as described with reference to FIG. 15.

In certain aspects, each boresight direction of each antenna module corresponds to a direction of a peak gain of the antenna module.

In certain aspects, the beam switch indicates a switch from an active beam to a target beam; and the target beam is based on the capability information.

In certain aspects, the antenna module switch indicates a switch from an active antenna module of the one or more antenna modules to a target antenna module of the one or more antenna modules; and the target antenna module is based on the capability information.

In certain aspects, each antenna module includes one or more sets of antennas; and each set of antennas of each antenna module is associated with a distinct boresight direction.

In certain aspects, each boresight direction is separated from another boresight direction by an angle threshold value.

In certain aspects, the capability information further includes a value of a peak gain in each boresight direction of each antenna module.

In certain aspects, the method 1300 further includes obtaining signaling indicating beam information comprising at least one of: a reference signal received power (RSRP) associated with an active beam of the UE; or a beam report indicating a transmission configuration indicator (TCI) state associated with the network entity.

In certain aspects, at least one of the beam switch or the antenna module switch is based on the capability information and at least one of: the beam information; or reference signal (RS) information indicating a grant of RSs to be communicated by at least one of the UE or the network entity.

Figure 15:
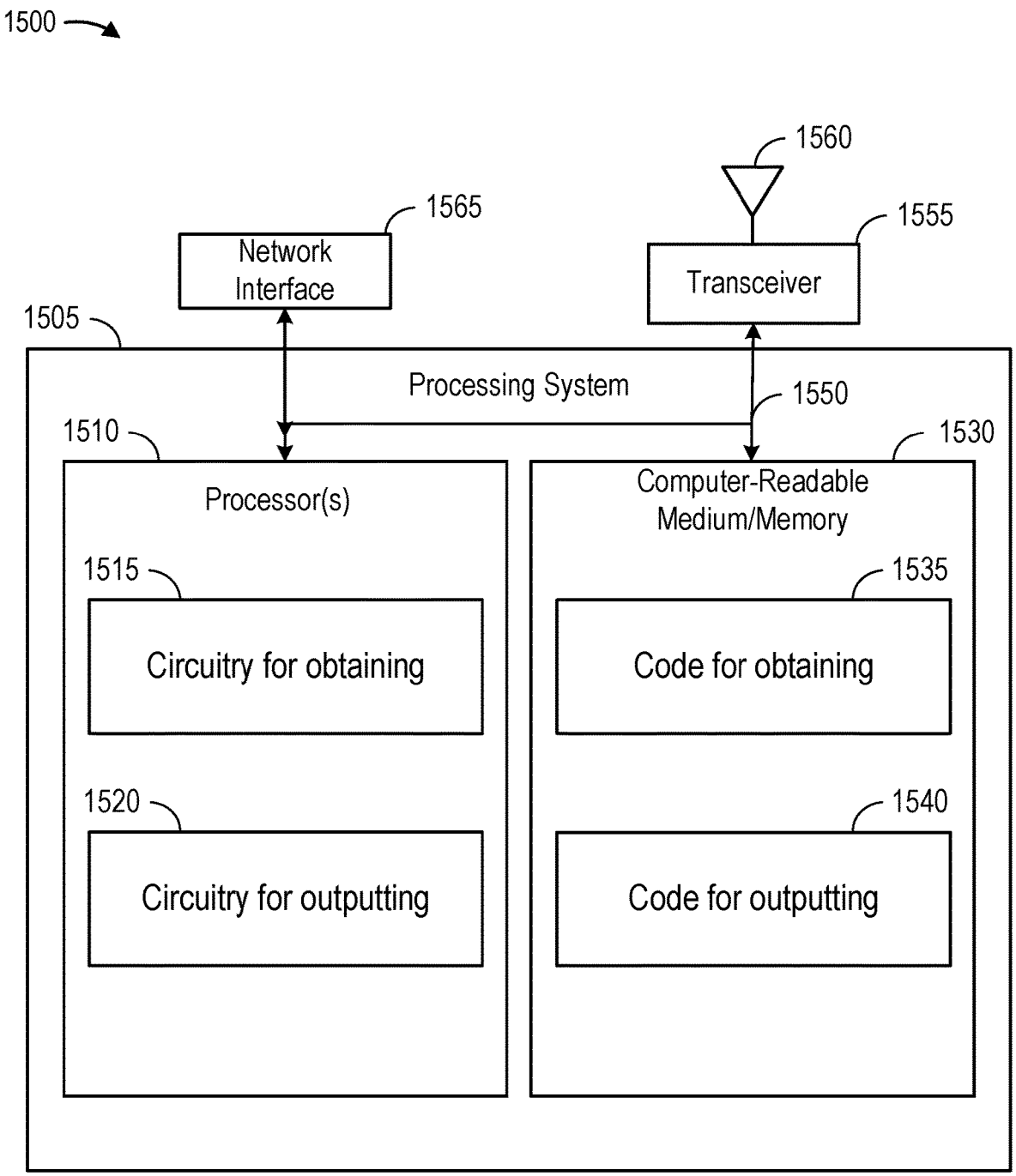

In one aspect, the method 1300, or any aspect related to it, may be performed by an apparatus, such as a communications device 1500 of FIG. 15, which includes various components operable, configured, or adapted to perform the method 1300. The communications device 1500 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, the communications device 1400 is a user equipment (UE), such as UE 104 described above with respect to FIG. 1 and FIG. 3.

The communications device 1400 includes a processing system 1405 coupled to a transceiver 1445 (e.g., a transmitter and/or a receiver). The transceiver 1445 is configured to transmit and receive signals for the communications device 1400 via an antenna 1450, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. The one or more processors 1410 are coupled to a computer-readable medium/memory 1425 via a bus 1440. In certain aspects, the computer-readable medium/memory 1425 is configured to store instructions (e.g., computer-executable code) that when executed by the one or more processors 1410, cause the one or more processors 1410 to perform the method 1200 described with respect to FIG. 12, and/or any aspect related to it. Note that reference to a processor performing a function of communications device 1400 may include the one or more processors 1410 performing that function of communications device 1400.

In the depicted example, computer-readable medium/memory 1425 stores code (e.g., executable instructions), such as code for outputting (or transmitting) 1430 and code for obtaining (or receiving) 1435. Processing of the code for outputting 1430 and the code for obtaining 1435 may cause the communications device 1400 to perform the method 1200 described with respect to FIG. 12, and/or any aspect related to it.

The one or more processors 1410 include circuitry configured to implement (e.g., execute) the code stored in the computer-readable medium/memory 1425, including circuitry such as circuitry for outputting (or transmitting) 1415 and circuitry for obtaining (or receiving) 1420. Processing with the circuitry for outputting 1415 and the circuitry for obtaining 1420 may cause the communications device 1400 to perform the method 1200 described with respect to FIG. 12, and/or any aspect related to it.

Various components of the communications device 1400 may provide means for performing the method 1200 described with respect to FIG. 12, and/or any aspect related to it. For example, means for transmitting, sending or outputting for transmission may include transceivers 354 and/or antenna(s) 352 of the UE 104 illustrated in FIG. 3 and/or the code for outputting 1430, the circuitry for outputting 1415, the transceiver 1445 and the antenna 1450 of the communications device 1400 in FIG. 14. Means for receiving or obtaining may include transceivers 354 and/or antenna(s) 352 of the UE 104 illustrated in FIG. 3 and/or the code for obtaining 1435, the circuitry for obtaining 1420, the transceiver 1445 and the antenna 1450 of the communications device 1400 in FIG. 14.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 14 is an example, and many other examples and configurations of communication device 1400 are possible.

FIG. 15 depicts aspects of an example communications device 1500. In some aspects, the communications device 1500 is a network entity, such as BS 102 of FIG. 1 and FIG. 3, or a disaggregated BS as discussed with respect to FIG. 2.

The communications device 1500 includes a processing system 1505 coupled to a transceiver 1555 (e.g., a transmitter and/or a receiver) and/or a network interface 1565. The transceiver 1555 is configured to transmit and receive signals for the communications device 1500 via an antenna 1560, such as the various signals as described herein. The network interface 1565 is configured to obtain and send signals for the communications device 1500 via communication link(s), such as a backhaul link, midhaul link, and/or fronthaul link as described herein, such as with respect to FIG. 2. The processing system 1505 may be configured to perform processing functions for the communications device 1500, including processing signals received and/or to be transmitted by the communications device 1500.

The processing system 1505 includes one or more processors 1510. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1530 via a bus 1550. In certain aspects, the computer-readable medium/memory 1530 is configured to store instructions (e.g., computer-executable code) that when executed by the one or more processors 1510, cause the one or more processors 1510 to perform the method 1300 described with respect to FIG. 13, or any aspect related to it. Note that reference to a processor of communications device 1500 performing a function may include the one or more processors 1510 of communications device 1500 performing that function.

In the depicted example, the computer-readable medium/memory 1530 stores code (e.g., executable instructions), such as code for obtaining (or receiving) 1535 and code for outputting (or transmitting) 1540. Processing of the code for obtaining 1535 and the code for outputting 1540 may cause the communications device 1500 to perform the method 1300 described with respect to FIG. 13, or any aspect related to it.

The one or more processors 1510 include circuitry configured to implement (e.g., execute) the code stored in the computer-readable medium/memory 1530, including circuitry such as circuitry for obtaining (or receiving) 1515 and circuitry for outputting (or transmitting) 1520. Processing with the circuitry for obtaining 1515 and the circuitry for outputting 1520 may cause the communications device 1500 to perform the method 1300 described with respect to FIG. 13, or any aspect related to it.

Various components of the communications device 1500 may provide means for performing the method 1300 described with respect to FIG. 13, or any aspect related to it. Means for transmitting, sending or outputting for transmission may include transceivers 332 and/or antenna(s) 334 of the BS 102 illustrated in FIG. 3 and/or the circuitry for outputting 1520, the code for outputting 1540, the transceiver 1555 and the antenna 1560 of the communications device 1500 in FIG. 15. Means for receiving or obtaining may include transceivers 332 and/or antenna(s) 334 of the BS 102 illustrated in FIG. 3 and/or the circuitry for obtaining 1515, the code for obtaining 1535, the transceiver 1555 and the antenna 1560 of the communications device 1500 in FIG. 15.

In some cases, rather than actually transmitting, for example, signals and/or data, a device may have an interface to output signals and/or data for transmission (a means for outputting). For example, a processor may output signals and/or data, via a bus interface, to an RF front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 15 is an example, and many other examples and configurations of communication device 1500 are possible. According to certain aspects, means for obtaining, means for receiving, means for outputting, means for transmitting, and/or means for performing may include one or more processors, such as depicted in FIG. 3.

Example Clauses

Implementation examples are described in the following numbered clauses:

Clause 1: A method for wireless communications at a network node, comprising: outputting, for transmission, signaling indicating capability information corresponding to one or more antenna modules of the network node, wherein the capability information comprises a quantity of boresight directions associated with each antenna module of the one or more antenna modules; and obtaining, after the capability information is output, an indication of at least one of: a beam switch or an antenna module switch.

Clause 2: The method of clause 1, wherein each boresight direction of each antenna module corresponds to a direction of a peak gain of the antenna module.

Clause 3: The method of any one of clauses 1-2, wherein: the beam switch indicates a switch from an active beam to a target beam; and the target beam is based on the capability information.

Clause 4: The method of clause 3, further comprising performing a beam switching procedure to switch from the active beam to the target beam, in accordance with the beam switch.

Clause 5: The method of any one of clauses 1-4, wherein: the antenna module switch indicates a switch from an active antenna module of the one or more antenna modules to a target antenna module of the one or more antenna modules; and the target antenna module is based on the capability information.

Clause 6: The method of clause 5, further comprising performing an antenna module switching procedure to switch from the active antenna module to the target antenna module, in accordance with the antenna module switch.

Clause 7: The method of any one of clauses 1-6, wherein: each antenna module comprises one or more sets of antennas; and each set of antennas of each antenna module is associated with a distinct boresight direction.

Clause 8: The method of any one of clauses 1-7, wherein each boresight direction is separated from another boresight direction by an angle threshold value.

Clause 9: The method of any one of clauses 1-8, wherein the capability information further comprises a value of a peak gain in each boresight direction of each antenna module.

Clause 10: The method of any one of clauses 1-9, further comprising outputting, for transmission, signaling indicating beam information comprising at least one of: a reference signal received power (RSRP) associated with an active beam of the network node; or a beam report indicating a transmission configuration indicator (TCI) state associated with another network node.

Clause 11: The method of clause 10, wherein at least one of the beam switch or the antenna module switch is based on the capability information and at least one of: the beam information; or reference signal (RS) information indicating a grant of RSs to be communicated by at least one of the network node or another network node.

Clause 12: A method for wireless communications at a network node, comprising: obtaining signaling indicating capability information corresponding to one or more antenna modules of another network node, wherein the capability information comprises a quantity of boresight directions associated with each antenna module of the one or more antenna modules; and outputting, for transmission, after obtaining the capability information, an indication to perform at least one of: a beam switch or an antenna module switch.

Clause 13: The method of clause 12, wherein each boresight direction of each antenna module corresponds to a direction of a peak gain of the antenna module.

Clause 14: The method of any one of clauses 12-13, wherein: the beam switch indicates a switch from an active beam to a target beam; and the target beam is based on the capability information.

Clause 15: The method of any one of clauses 12-14, wherein: the antenna module switch indicates a switch from an active antenna module of the one or more antenna modules to a target antenna module of the one or more antenna modules; and the target antenna module is based on the capability information.

Clause 16: The method of any one of clauses 12-15, wherein: each antenna module comprises one or more sets of antennas; and each set of antennas of each antenna module is associated with a distinct boresight direction.

Clause 17: The method of any one of clauses 12-16, wherein each boresight direction is separated from another boresight direction by an angle threshold value.

Clause 18: The method of any one of clauses 12-17, wherein the capability information further comprises a value of a peak gain in each boresight direction of each antenna module.

Clause 19: The method of any one of clauses 12-18, further comprising obtaining signaling indicating beam information comprising at least one of: a reference signal received power (RSRP) associated with an active beam of the other network node; or a beam report indicating a transmission configuration indicator (TCI) state associated with the network node.

Clause 20: The method of clause 19, wherein at least one of the beam switch or the antenna module switch is based on the capability information and at least one of: the beam information; or reference signal (RS) information indicating a grant of RSs to be communicated by at least one of the other network node or the network node.

Clause 21: An apparatus, comprising: a memory comprising executable instructions; and one or more processors configured, individually or in any combination, to execute the executable instructions and cause the apparatus to perform a method in accordance with any one of Clauses 1-20.

Clause 22: An apparatus, comprising means for performing a method in accordance with any one of Clauses 1-20.

Clause 23: A non-transitory computer-readable medium comprising executable instructions that, when executed by one or more processors of an apparatus, cause the apparatus to perform a method in accordance with any one of Clauses 1-20.

Clause 24: A computer program product embodied on a computer-readable storage medium comprising code for performing a method in accordance with any one of Clauses 1-20.

Clause 25: A user equipment (UE), comprising: at least one transceiver; a memory comprising executable instructions; and one or more processors configured, individually or in any combination, to execute the executable instructions and cause the UE to perform a method in accordance with any one of Clauses 1-11, wherein the at least one transceiver is configured to: transmit the signaling indicating the capability information and receive the indication of at least one of: the beam switch or the antenna module switch.

Clause 26: A network entity, comprising: at least one transceiver; a memory comprising executable instructions; and one or more processors configured, individually or in any combination, to execute the executable instructions and cause the network entity to perform a method in accordance with any one of Clauses 12-20, wherein the at least one transceiver is configured to: receive the signaling indicating the capability information and transmit the indication to perform at least one of: the beam switch or the antenna module switch.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications, comprising:
at least one memory comprising instructions; and
one or more processors configured, individually or in any combination, to execute the instructions to cause the apparatus to:
output, for transmission, signaling indicating capability information corresponding to one or more antenna modules of the apparatus, wherein the capability information comprises:
a quantity of boresight directions associated with each antenna module of the one or more antenna modules, and
a value of a peak gain in each boresight direction of each antenna module; and
obtain, after the capability information is output, an indication of at least one of:
a beam switch, or
an antenna module switch.

2. The apparatus of claim 1, wherein each boresight direction of each antenna module corresponds to a direction of a peak gain of the antenna module.

3. The apparatus of claim 1, wherein:
the beam switch indicates a switch from an active beam to a target beam; and
the target beam is based on the capability information.

4. The apparatus of claim 3, wherein the one or more processors are configured, individually or in any combination, to execute the instructions to cause the apparatus to perform a beam switching procedure to switch from the active beam to the target beam, in accordance with the beam switch.

5. The apparatus of claim 1, wherein:
the antenna module switch indicates a switch from an active antenna module of the one or more antenna modules to a target antenna module of the one or more antenna modules; and
the target antenna module is based on the capability information.

6. The apparatus of claim 5, wherein the one or more processors are configured, individually or in any combination, to execute the instructions to cause the apparatus to perform an antenna module switching procedure to switch from the active antenna module to the target antenna module, in accordance with the antenna module switch.

7. The apparatus of claim 1, wherein:
each antenna module comprises one or more sets of antennas; and
each set of antennas of each antenna module is associated with a distinct boresight direction.

8. The apparatus of claim 1, wherein each boresight direction is separated from another boresight direction by an angle threshold value.

9. The apparatus of claim 1, wherein the one or more processors are configured, individually or in any combination, to execute the instructions to cause the apparatus to output, for transmission, signaling indicating beam information comprising at least one of:
a reference signal received power (RSRP) associated with an active beam of the apparatus; or
a beam report indicating a transmission configuration indicator (TCI) state associated with a network entity.

10. The apparatus of claim 9, wherein at least one of the beam switch or the antenna module switch is based on the capability information and at least one of:
the beam information; or
reference signal (RS) information indicating a grant of RSs to be communicated by at least one of the apparatus or a network entity.

11. The apparatus of claim 1, further comprising at least one transceiver, wherein the at least one transceiver is configured to transmit the signaling indicating the capability information and receive the indication of at least one of: the beam switch or the antenna module switch, and wherein the apparatus is configured as a user equipment (UE).

12. An apparatus for wireless communications, comprising:
at least one memory comprising instructions; and
one or more processors configured, individually or in any combination, to execute the instructions to cause the apparatus to:
obtain signaling indicating capability information corresponding to one or more antenna modules of a user equipment (UE), wherein the capability information comprises:
a quantity of boresight directions associated with each antenna module of the one or more antenna modules, and
a value of a peak gain in each boresight direction of each antenna module; and
output, for transmission, after obtaining the capability information, an indication to perform at least one of:
a beam switch, or
an antenna module switch.

13. The apparatus of claim 12, wherein each boresight direction of each antenna module corresponds to a direction of a peak gain of the antenna module.

14. The apparatus of claim 12, wherein:
the beam switch indicates a switch from an active beam to a target beam; and
the target beam is based on the capability information.

15. The apparatus of claim 12, wherein:
the antenna module switch indicates a switch from an active antenna module of the one or more antenna modules to a target antenna module of the one or more antenna modules; and
the target antenna module is based on the capability information.

16. The apparatus of claim 12, wherein:
each antenna module comprises one or more sets of antennas; and
each set of antennas of each antenna module is associated with a distinct boresight direction.

17. The apparatus of claim 12, wherein each boresight direction is separated from another boresight direction by an angle threshold value.

18. The apparatus of claim 12, wherein the one or more processors are configured, individually or in any combination, to execute the instructions to cause the apparatus to obtain signaling indicating beam information comprising at least one of:
    a reference signal received power (RSRP) associated with an active beam of the UE; or
    a beam report indicating a transmission configuration indicator (TCI) state associated with the apparatus.

19. The apparatus of claim 18, wherein at least one of the beam switch or the antenna module switch is based on the capability information and at least one of:
    the beam information; or
    reference signal (RS) information indicating a grant of RSs to be communicated by at least one of the UE or the apparatus.

20. The apparatus of claim 12, further comprising at least one transceiver, wherein the at least one transceiver is configured to receive the signaling indicating the capability information and transmit the indication to perform at least one of: the beam switch or the antenna module switch, and wherein the apparatus is configured as a network entity.

21. A method for wireless communications at a network node, comprising:
    outputting, for transmission, signaling indicating capability information corresponding to one or more antenna modules of the network node, wherein the capability information comprises:
        a quantity of boresight directions associated with each antenna module of the one or more antenna modules, and
        a value of a peak gain in each boresight direction of each antenna module; and
    obtaining, after the capability information is output, an indication of at least one of:
        a beam switch, or
        an antenna module switch.

22. The method of claim 21, further comprising:
    outputting, for transmission, signaling indicating beam information comprising at least one of:
        a reference signal received power (RSRP) associated with an active beam of the apparatus; or
        a beam report indicating a transmission configuration indicator (TCI) state associated with a network entity.

23. The method of claim 22, wherein at least one of the beam switch or the antenna module switch is based on the capability information and at least one of:
    the beam information; or
    reference signal (RS) information indicating a grant of RSs to be communicated by at least one of the network node or another network node.

* * * * *